(12) United States Patent
Smith (10) Patent No.: US 6,334,095 B1
(45) Date of Patent: Dec. 25, 2001

(54) METHOD FOR ASSESSING PLANT CAPACITY

(76) Inventor: Jan Bryan Smith, 13676 Greenview Ave., Baton Rouge, LA (US) 70816

( * ) Notice: Subject to any disclaimer, the term of this patent is extended or adjusted under 35 U.S.C. 154(b) by 0 days.

(21) Appl. No.: 09/190,659

(22) Filed: Nov. 12, 1998

(51) Int. Cl.[7] .............................. G06F 10/14; G06F 15/00; G06F 17/18
(52) U.S. Cl. ........................ 702/181; 702/182; 700/108
(58) Field of Search ................................ 702/81–84, 114, 702/127, 176, 185, 187; 705/7–9; 700/108, 109, 115

(56) References Cited

U.S. PATENT DOCUMENTS

| 4,410,950 | * | 10/1983 | Toyoda et al. | 701/99 |
| 4,827,423 | * | 5/1989 | Beasley et al. | 700/96 |
| 5,634,039 | * | 5/1997 | Simon et al. | 703/18 |
| 5,734,567 | * | 3/1998 | Griffiths et al. | 700/79 |

FOREIGN PATENT DOCUMENTS

401088892A * 4/1989 (JP) .

OTHER PUBLICATIONS

Locks, Mitchell O. Reliability, Maintainability, and Availability Assessment, 1995, pp. 193–211.*
Locks, Mitchell O.; *Reliability, Maintainability, and Availability Assessment*, 1995, Ch. 10, pp. 193–211 "Maintainability and Availability"; ASQC Quality Press, Milwaukee, Wisconsin.
Plant Availability Measurement, Plotting and Simulation; Jan B. Smith and Preston F. Rockhold; Nov., 1996; Amsterdam, The Netherlands.

* cited by examiner

*Primary Examiner*—Marc S. Hoff
*Assistant Examiner*—Manuel L. Barbee
(74) *Attorney, Agent, or Firm*—Jones, Walker, Waechter, Poitevent, Carrere & Denegre, L.L.P.

(57) ABSTRACT

A method to determine the capacity of a plant over a time window of interest, the time window having a time length P, having the steps of:

(a) gathering the plant's historical production data over a selected time period of length L and calculating the cycle entries for that data set;

(b) calculating capacity $C(i,1)$ for each contiguous portion $p(i,1)$ of length p of the cycle entries from the previous step;

(c) storing that calculated capacities $C(i,1)$;

(d) randomly shuffling the cycle entries;

(e) calculating the capacity $C(i,2)$ for each contiguous portion $p(i,2)$ of the shuffled cycle entries;

(f) storing the calculated capacities $C(i,2)$; and (g) repeating steps (e)–(f) for a sufficient number of iterations, and then creating a histogram of the calculated capacities $C(i,j)$.

29 Claims, 10 Drawing Sheets

Capacity and Availability Assessment Process

Figure 1 – Capacity and Availability Assessment Process

Figure 2 – Capacity and Availability Assessment Process (Continued)

Figure 3

Simple Daily Production Data to Illustrate the Concept

| DATE | PRODUCTION | DATE | PRODUCTION |
|---|---|---|---|
| 1-Jan | 900 | 16-Jan | 900 |
| 2-Jan | 910 | 17-Jan | 925 |
| 3-Jan | 905 | 18-Jan | 894 |
| 4-Jan | 890 | 19-Jan | 650 |
| 5-Jan | 700 | 20-Jan | 450 |
| 6-Jan | 700 | 21-Jan | 885 |
| 7-Jan | 901 | 22-Jan | 925 |
| 8-Jan | 925 | 23-Jan | 915 |
| 9-Jan | 915 | 24-Jan | 903 |
| 10-Jan | 910 | 25-Jan | 895 |
| 11-Jan | 895 | 26-Jan | 840 |
| 12-Jan | 0 | 27-Jan | 925 |
| 13-Jan | 600 | 28-Jan | 0 |
| 14-Jan | 888 | 29-Jan | 901 |
| 15-Jan | 915 | 30-Jan | 903 |
|  |  | 31-Jan | 925 |

Figure 5

Analysis of Figure 3 Daily Production Data

| DATE (note 1) | TBF (note 2) | TTR (note 3) | CYCLE TIME (note 4) | GOAL (PERIOD MEAN) (note 5) | CUMULATIVE TBF | CUMULATIVE MEAN TBF (note 6) | ELAPSED TIME (note 7) | CUMULATIVE DIFFERENCE (note 8) |
|---|---|---|---|---|---|---|---|---|
| 12/31 | 0 | 0 | | | | | | 0 |
| 1/5 | 5.555555556 | 0.444444444 | 6 | 0.883154122 | 5.555555556 | 5.298924731 | 6 | 0.256630824 |
| 1/12 | 5.666666667 | 1.333333333 | 7 | 0.883154122 | 11.22222222 | 11.48100358 | 13 | -0.258781362 |
| 1/19 | 6.222222222 | 0.777777778 | 7 | 0.883154122 | 17.44444444 | 17.66308244 | 20 | -0.218637993 |
| 1/26 | 5.933333333 | 0.066666667 | 6 | 0.883154122 | 23.37777778 | 22.96200717 | 26 | 0.415770609 |
| 1/28 | 1 | 1 | 2 | 0.883154122 | 24.37777778 | 24.72831541 | 28 | -0.350537634 |
| 1/31 | 3 | 0 | 3 | 0.883154122 | 27.37777778 | 27.37777778 | 31 | 0 |
| TOTALS | 27.37777778 | 3.622222222 | | | | | | |

Notes:
1. Date – Date at which a production incident was first reflected as a production reduction. A production incident is incurred when production falls below an established threshold.
2. TBF -- Time Between Failure (production incident). Obtained from cycle time = TBF + TTR. Therefore, TBF = cycle time - TTR
3. TTR –Time to Restore or recover from a production loss due to a failure incident, converted to equivalent days by dividing the production loss by the nominal daily production at the time of the failure incident. An example follows for the TTR determination for Figure 3 production loss on January 5th and 6th.
   Loss = (Nominal Daily Production – Actual Production) / Nominal Daily Production
   For 1/5:  (900-700) / 900 = 0.222 days outage
   For 1/6:  (900-700) / 900 = 0.222 days outage
   Total TTR for this outage = 0.222 + 0.222 = 0.444 days
4. Cycle Time – The time from the end of one production incident to the end of the next production incident. The end of a production incident is the time at which desired production is achieved. Therefore, cycle time = TBF + TTR
5. Goal (Period mean) – The final cumulative TBF divided by the final elapsed time. Used to develop cumulative difference trend plot. It is analogous to the goal or target in a conventional cumulative sum chart.
6. Cumulative Mean TBF – The current elapsed time multiplied by the goal (period mean). Used to develop cumulative difference trend plot. No special significance otherwise.
7. Elapsed time -- Cumulative cycle time used to develop cumulative difference trend plot. No special significance otherwise.
8. Cumulative difference – The cumulative TBF minus cumulative mean TBF. Used to develop cumulative difference trend plot. No special significance otherwise.

Conceptual representation of the process for determining emperical probability distributions for the failure data of Figure 5

Figure 10

//METHOD FOR ASSESSING PLANT CAPACITY

FIELD OF INVENTION

This invention relates to methods for determining plant capacity, and in particular, to probabilistic methods to evaluate a plant's capacity.

PRIOR ART

Manufacturing plants have operational interruptions due to equipment failure and process and operating problems, which reduce production rates below that which is desired. Measurement of the negative impact that these problems have had on the production capability of the plant is important as a performance indicator and as a guide for production planning in the future. These interruptions to production continuity are functional failures. Some functional failures do not cause a total cessation of production, but only a reduction in manufacturing rate. These reductions in rate may be ignored in the measurement of plant availability in some manufacturing facilities but appropriately are converted to equivalent downtime by many plants. For example, operation at 50% of capacity for two days because of an operational problem is the equivalent of one day of complete downtime.

The maximum possible operating time is determined from the total time within a time period of interest, for example 8760 hours per year. Market-dictated downtime due to lack of sales or any other similar administrative downtime reduces the maximum operating time.

The ratio of total plant downtime to total time, as adjusted in the preceding paragraph, is a measure of plant unavailability. Its complement is plant availability. Plant availability is a common performance measure for a plant. Thus defined, plant availability is never greater than 100% and a reasonable range is 60% to 98%, for a range of industries. Downtime reduces the productivity of a manufacturing facility because reduced production may result in loss of sales and profits. Maintenance and Reliability Engineering organizations in plants have primary goals of optimizing downtime to economical levels to avoid production shortfalls and profit loss.

Plant reliability engineers and others involved in plant reliability have adopted the term "availability" from classical reliability engineering definitions. "Availability" is derived, in classical reliability, from "reliability" and "maintainability". For repairable systems like plants, reliability is measured with Mean Time Between Failure (MTBF) and maintainability with Mean Time to Restore (MTTR). Availability is then defined as:

Availability=MTBF/(MTBF+MTTR)

This is identical to the ratio of uptime to total time or actual production to maximum possible production. However one makes the calculation, the term availability is commonly used. Availability translates into plant capacity, i.e. 95% plant availability means the plant is capable of producing 95% of maximum capacity if called upon to do so. Because of the traditional definitions discussed in the preceding paragraph, "availability" is often used when "capacity as a percent of maximum" better relates to the business purpose of such a measurement. The terms used are not so important as long they do not result in miscommunication. We will generally use the term "capacity". This is a contraction of "capacity as a percent of maximum". Furthermore, this may be indicated as a fraction instead of percent.

Current Practice

Historical plant performance is the basis for projecting future performance. Appropriate allowances are made to reflect changing physical and organizational conditions. The historical performance may be measured with availability, uptime (the complement of downtime), or simply the produced volumes measured over a time interval. When the measurements are rigorous, identical results are obtained. These measures are single-valued; that is, a single number describing the arithmetical mean is all that is known about the measure. The future plant capacity is actually a probability distribution. The actual plant capacity will vary due to chance, but this variability is undefined and not measured in current practice. Nonetheless, these single-valued averages are the foundation for production planning and setting reliability priorities.

Current State-of-the-Art

The current state-of-the-art for capacity and availability calculations for a plant is Monte Carlo computer simulation (or Monte Carlo-like simulations). One such use of Monte Carlo simulations was described in Plant Availability Measurement, Plotting and Simulation, by Jan Smith and Preston Rockhold, a paper presented at the International Conference on Process Plant Reliability-Europe, 1996, which is hereby incorporated by reference (this reference, however, investigated methods other than the use of detailed equipment data). This Monte Carlo simulation is not used in most plants because of accuracy and cost considerations. Distributions for time to failure and time to restore are determined for the individual equipment or subsystems that make up the plant. Random draws from these individual distributions allow the operating performance of the plant to be simulated numerous times. The composite simulations provide a probability distribution for plant capacity.

SUMMARY OF THE INVENTION

The approach to determining a probabilistic forecast for capacity as shown in this patent application is not based on Monte Carlo or Monte Carlo-like approaches. It is an improvement to the current state-of-the-art in the following ways:

1. The current state-of-the-art method requires the time to failure distributions and time to restore distributions for the individual equipment or subsystems that make up the plant; however, these are seldom known. In practice, these data are often obtained by estimates and there is no way to check the accuracy of the resulting distribution shape. When estimates are used, this approach is only appropriate for comparing the relative results of different equipment configurations or operating strategies. The new process eliminates the need for this particular data. The new process uses commonly available accounting quality data.

2. Current Monte Carlo approaches commonly assume independence between a random draw for time to failure and that for time to restore. Any attempt to account for dependency requires the relationship between time to failure and time to restore to be known. This is usually unknown. Furthermore, any thorough treatment to correct for dependence is difficult and costly. The dependency between failures and their restore times is reflected in the new process. Any failure, and its respective restore time, are treated as an inseparable set.

3. The net effects of the improvements in current state-of-the-art made by this process are: 1) plant management access to a new set of business decision information, and 2) engineers are provided probabilistic data that allows an unprecedented level of analysis for reliability purposes.

Accordingly, a method is provided to determine the capacity distribution of a plant over a zone of interest, the zone having a time length P, the method having the steps of (1) gathering said plant's historical production data over a selected time period of length L, calculating TBF(k), TTR(k) for each failure (k=1, N failures) and creating the ordered cycle entries (TBF, TTR)(k), each of length TTR(k)+TBF(k), from said production data;

(2) calculating the capacity (C(i,1)) for each contiguous portion of length P of the data;

(3) storing that calculated capacities C(i,1);

(4) randomly shuffling the calculated cycle entries;

(5) calculating the capacities (C(i,2)) for each contiguous portion of length P of the shuffled data set;

(6) storing the calculated capacities C(i,2);

(7) repeating steps (4)–(6) until sufficient capacities are stored to produce a robust capacity distribution;

(8) Calculating a histogram from the capacities C(i,j).

BRIEF DESCRIPTION OF THE DRAWINGS

FIG. 5—Analysis of FIG. 3 data showing extraction of TBF and TTR data and the information for the sensitive trend plot.

DETAILED DESCRIPTION OF THE INVENTION

In the present invention, capacity will be discussed in terms of the available time for utilization, and the actual time of utilization, as (actual utilization/available utilization). However, the actual scope of the term is broader and includes availability, utilization and reliability, and other concepts familiar with those in the art. We will discuss utilization in terms of TTR and TBF, where TTR is the time to recover from a production failure, and TBF is the time between productions failures. The total time between successive failures (failure I and I+1) is thus TTR(I)+TBF(I). This TTR(I)+TBF(I) defines a cycle, a concept which will be important later. In these terms capacity is defined as $$1-(\Sigma TTR(I)/Y); \text{ where}$$

TTR(I) represents the ith interval of downtime (time to recover from the ith failure) generally measured in days, hours, etc.) and Y represents the total time interval over which the capacity is to be determined, that is, $Y=\Sigma(TBF(I)+TTR(I))$, or Y=sum of all cycle times.

Note that capacity can equivalently be expressed in terms of the up-time, or time between failures as $\Sigma TBF(I)/Y$.

Figure 1:
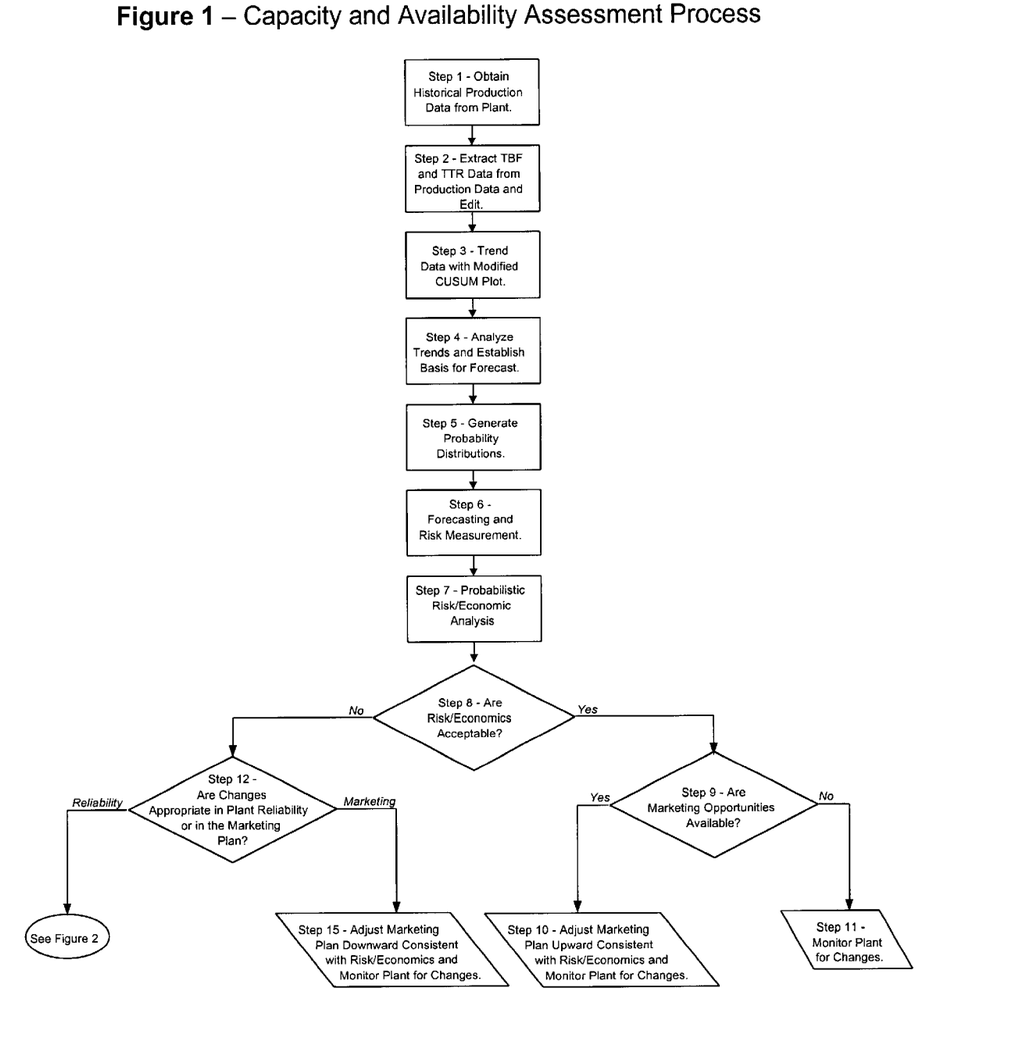
FIG. 1—A flow diagram of the Capacity and Availability Assessment Process described in this application.
Figure 2:
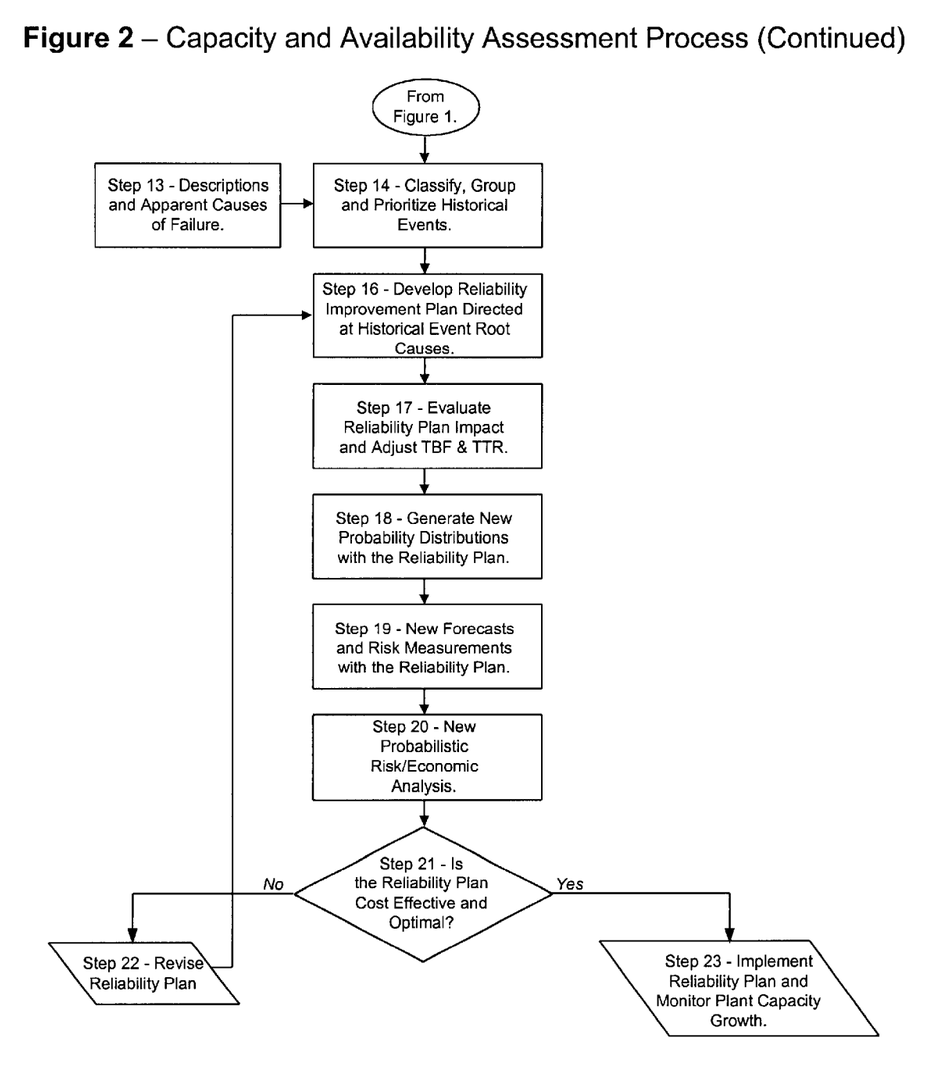
FIG. 2—The above flow diagram continued.

The total process is described schematically in the flow sheet of FIGS. 1 and 2.

Step 1

This step requires that the historical production data be compiled. By plant we mean a manufacturing plant, sub-unit of a plant, assembly line or any plant where goods or services are created or assembled. This process is applicable for plants that have some operating history. The production history is used to obtain the raw data for the process. In most plants, production history is normally measured and records maintained for each day. Some plants may record production by shift or by hour. The process uses data for the smallest interval of time for which data is available. To simplify the following discussion, we assume the smallest time interval is daily. The daily production data of FIG. 3 will be used to illustrate the concept. It also demonstrates how useful probability distributions are obtained with only a small amount of data. "Historical" data for a new start-up plant will not be available, so "historical data" for a plant can include data from another plant used as an analogue, or a created data set constructed to reflect expected plant conditions. Likewise, such data may be supplemented by analogue or created data.

Step 2

Figure 3:
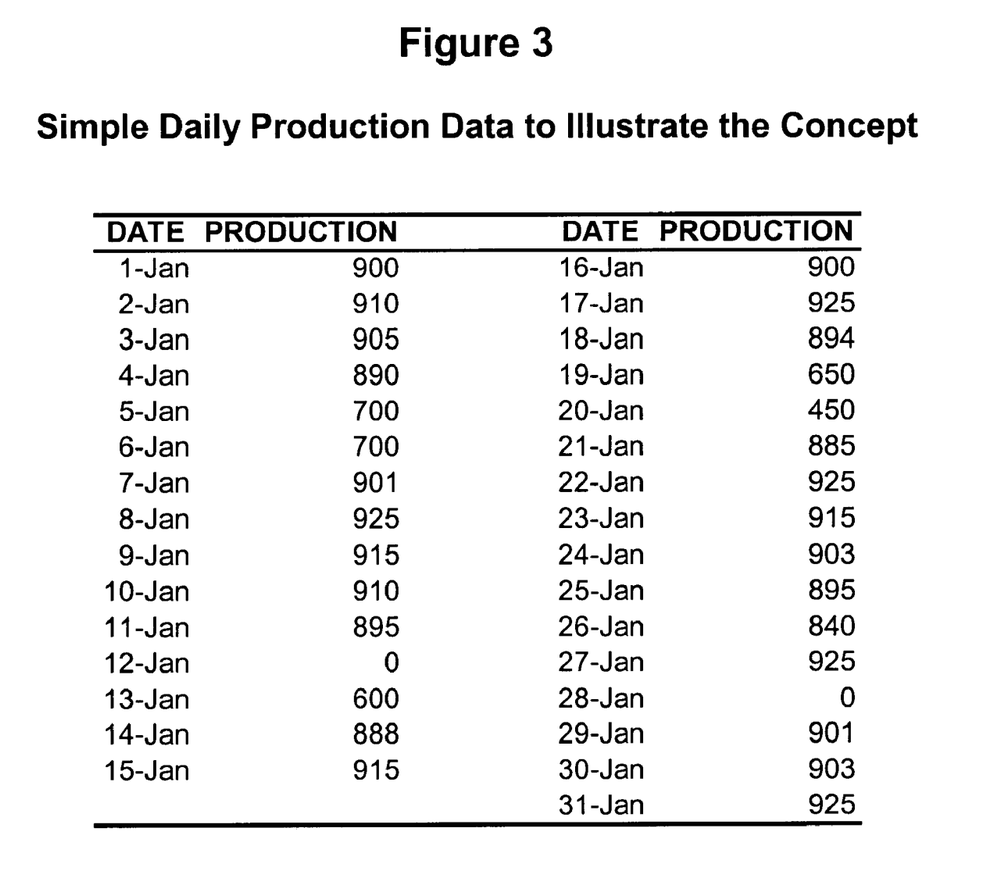
FIG. 3—Simple fictitious daily production of a plant for illustration.
Figure 4:
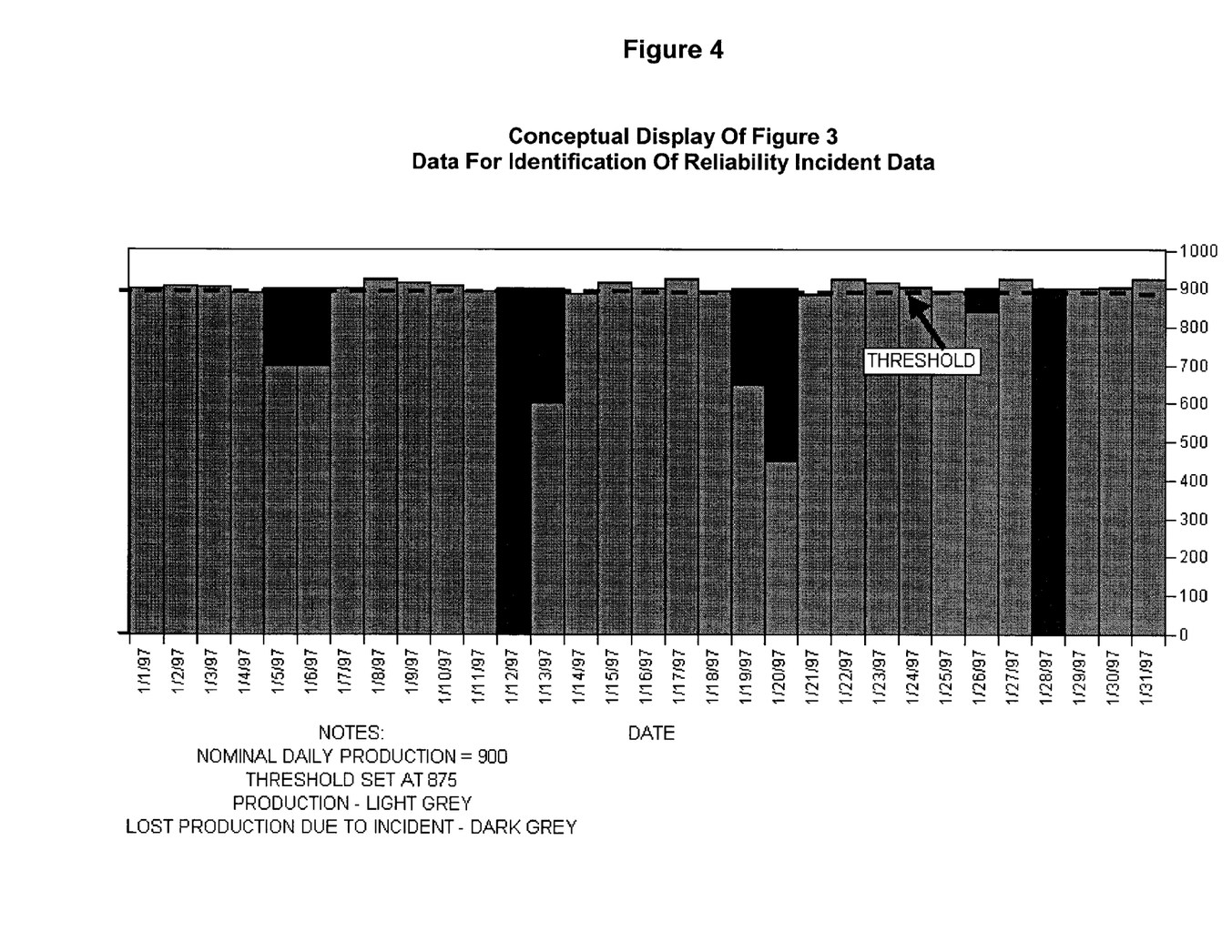
FIG. 4—Conceptual display of daily production to illustrate how reliability incidents (failures) are extracted from the daily production.

From the daily production data of FIG. 3, production failure events are identified. A production failure, or failure, shall indicate that production fell below a threshold level (threshold levels can change over time). Once each failure is identified, the time between failure (TBF) and time to restore (TTR) information are extracted. FIGS. 3 and 4 conceptually illustrate how the daily production is converted into TBF and TTR data. When production levels are not met on consecutive days, for ease of calculation, the consecutive days are considered a single production failure. For instance, as is shown in FIG. 4, a production failure occurs on day 5 and continues through day 6 (a day is the smallest unit of record keeping). Over the interval of the first six days, there is one production failure. On day 5 and day 6, production was 700 units each day, while the threshold production level was 875. To determine TTR or TBF, it is more convenient to calculate TTR and TBF as a function of production units, instead of a "time" unit. For this purpose, we calculate a nominal production (the average of all daily production units above the designated threshold unit), and in these units, for instance, TTR=(Nominal production-actual production)/(Nominal production). For ease of explanation and computation, we will assume that the nominal production for the data shown in FIG. 3 is 900 (in actuality, the Nominal production is 906.52). Thus, the TTR for days 5 and 6 is [(900−700)/900+(900−700)/900] or 0.444 "days," while TBF is 6−0.444, or 5.556 days. These calculations are reflected in the table contained in FIG. 5 (again, using a nominal production of 900).

The first six days constitutes one cycle, the total time between successive production failures. Note that the length of a cycle is not fixed as time between failures and failure restore times are not fixed. Cycle length, however, will be in whole numbers of the base measurement unit. Also calculated are cycle entries (TBF, TTR) for each failure, the cycle entry being of length TTR+TBF (alternatively, a cycle could be defined as (TTR, TBF), that is, the cycle could begin either on a production failure, TTR, instead of beginning on production, TBF. Either definition is appropriate, however, it is important for a particular analysis, that once chosen, the definition of cycle is not altered. The remaining analysis will assume a cycle is defined as (TBF, TTR) which implies that the plant's history must begin during production time, and end in a production failure). A cycle entry represents one production cycle, consisting of plant production for a certain time TBF, followed by no plant production for a time of TTR. Each production failure has its associated cycle entry. Creation of a set of cycle entries from the production data results in a cycle entry data set, the set may be a complete set, or a partial set.

As can be seen in FIG. 4, there are typical day to day variations in production for reasons as subtle as measurement error and atmospheric pressure and temperature. These are minor variations of no consequence and are separated from significant failure events using a threshold level as shown in FIG. 4. The threshold can be established at any and various levels in order to screen out minor system noise without missing real failure events.

FIG. 5 shows the TBF and TTR data extracted from FIG. 4. In practice the data of FIG. 5 are extracted directly from FIG. 3 data. The data are edited to exclude any capacity reduction due to lack of sales, lack of raw materials or other events not attributable to the plant operation.

Steps 3–4. These steps involve analysis/editing of the data set from step 2 to remove data points that are not relevant to future production. For instance, for a plant operating for several years, it may not be desirable to keep that portion of the data set which represents plant startup, as plant startup conditions may not be reflective of current operating conditions. Another instance requiring editing would be where troublesome equipment which resulted in periodic downtime, had been replaced with more reliable equipment. To more accurately project plant capacity, those down times associated with the replaced equipment might be edited out. Obviously, editing can be done on the raw plant data or on the ordered cycle pair data set.

Step 3

This step contains the preparation for the analysis of the data set to help decide what to edit. This step generally trends the historical data. The preferred method to analyze the data is to plot a variation of a cumulative sum plot (CUSUM) sometimes used for quality and reliability analysis.

Figure 6:
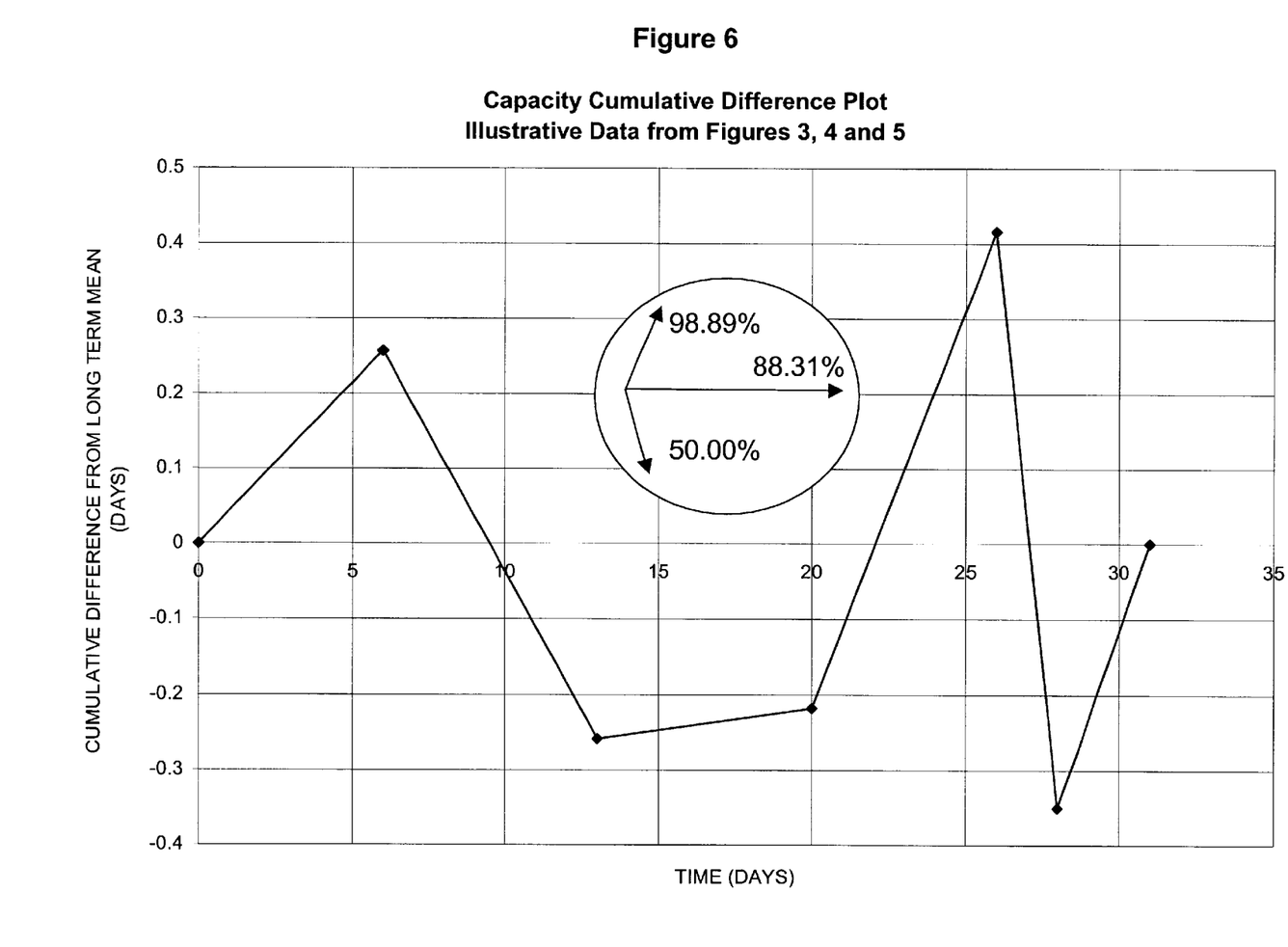
FIG. 6—A plot of capacity cumulative difference for the illustrative data. This plot is similar to a CUSUM (cumulative sum plot) used in quality control and reliability applications to detect trends sensitively. This plot shows the method but is trivial.

The plot is especially sensitive to trends in data. A trend plot for capacity is developed for the production incidents of FIGS. 3, 4 and 5 as shown in FIG. 6. In this plot each failure incident from FIG. 5 results in a data point, in addition to beginning and ending points. The plot points are determined in FIG. 5. The horizontal axis plot locations are, beginning at zero, the elapsed time (cumulative cycle time). The vertical axis plot points are, beginning at zero, the cumulative differences as defined in FIG. 5. Deviations of the plot from horizontal indicate deviations from the mean capacity for the entire period. Positive slopes between plot points indicate the capacity for the time comprised by those points is greater than the mean for the entire period; negative slopes indicate capacity is below the mean. The difference between the cumulative TBFs for the two locations divided by the difference between the elapsed time (cumulative cycle time) for the two locations is the capacity within the plot locations. Dates are associated with each plot location. The legend within the FIG. 6 plot indicates the capacity for a limited number of slopes. Capacities are not linear with the slope angle.

Step 4

Figure 7:
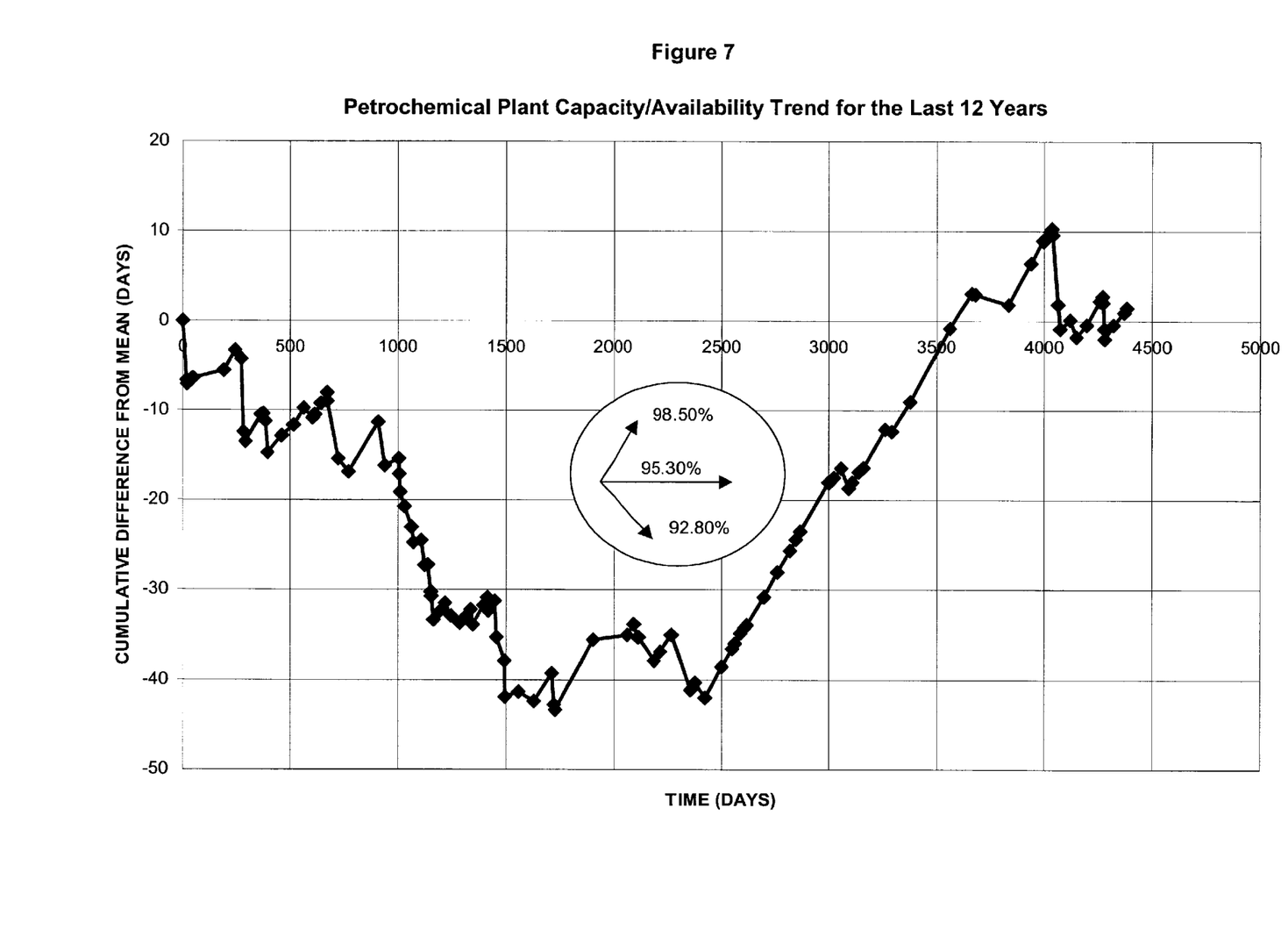
FIG. 7—A capacity trend plot like FIG. 6 but for a 12-year period for petrochemical plant. Significant trends are readily detected.

This step involves removing those data points found to be unreflective of future trends. The conceptual data of FIG. 6 are too simplistic to show the reason for this unusual though highly sensitive trend plot. The need for this sensitivity is seen from FIG. 7 showing data from a plant over a time span of 12 years. In this real data there is a period of very low capacity for the first 4.7 years. It may, for example, be appropriate to exclude this period from a capacity forecast if it is expected to be unrepresentative of future capacity. Capacity changes with time are not as clearly evident using conventional trending. Furthermore, failure events can be edited to remove or modify certain TBF or TTR to reflect plant correction of the problem which generated the respective TBF or TTR, whether a correction is experienced or anticipated. This step allows plant knowledge and engineering judgement to be used to modify any historical data before proceeding. It thereby establishes the basis for the probabilistic analysis.

Step 5

This step involves the creation of the probability distributions. In practice, the distribution will be desired for a certain time window of length P, such as a year. The time window used in extracting the distributions should be selected with consideration for the purpose of the risk assessment. Most plants are concerned with making their production goals next year; therefore, a one-year window would be necessary. Should a plant have a forthcoming peak sales season expected to last three months, then a three-month window is necessary to assess their capacity for that season. In some instances, it may be useful to edit the historical data set so that only the season of interest is present: for instance, if summer production is the season of interest, it may be desirable to remove all past history of the plant outside the summer season. In this fashion, the calculated distribution may more accurately reflect any dependencies in the data set which are associated with the summer season.

To determine the capacity distribution of a plant over a time window of interest involves the steps of:

(1) calculating the capacity $C(i,1)$ for each contiguous portion $p(i,1)$ of length P of the cycle entry data set, where the capacity is calculated as $1-(\Sigma(TTR(I))$ within the portion $p(i,1))/P)$;

(2) storing that calculated capacities $C(i,1)$;

(3) randomly shuffling the cycle entries $(TBF,TTR)(I)$;

(4) calculating the capacity $C(i,2)$ for each contigious portion $p(i,2)$ of the shuffled cycle entry data set as $1-(\Sigma(TTR(I))$ within the portion $p(i,2))/P)$ (capacities are generally not calculated when the moving length P window lacks entries because the window is at the end of the data set);

(5) storing the calculated capacities $C(i,2)$. Repeating this process for a sufficient number of iterations, and then creating a frequency histogram (possibly normalized) of the calculated capacities $C(i,j)$, (where $j>2$).

As used above, contiguous means in a time sense; that is, a contiguous portion of length P means any continuous portion of time length P of the ordered data set (TBF,TTR)(1), (TBF,TTR)(2), . . . (TBF,TTR)(N), or the shuffled ordered data set, when the ordered data set of cycle entries is considered as a linear ordered time line (TBF(1), TTR(1), TBF(2),TTR(2), . . . ,TBF(N), TTR(N)), or the linear time line of the shuffled ordered cycle entries (the "length" of the data set is N elements).

For ease of understanding, the above process can be conceptualized as follows:

The distribution will be built for a given window of interest, having a length P. The edited data set covers a time period of length Y, having N down times within that period, TTR(I), I=1, N, and the associated TBF(I), I=1, N and cycle times, where $\Sigma(TTR(I)+TBF(I))=Y$ (summed over all I). A time length is chosen to produce the distribution, where the time length is a whole number multiplier of length Y (and the multiplier may be several thousand, such as 10,000). This chosen length is then subdivided into contiguous intervals of length Y. Within each subdivided interval is placed the cycle events (TBF,TTR) (I), I=1, N, in a random fashion, filling the interval. The placement can be made by a random number generator. Each interval thus has N cycle events placed randomly therein, each intervals placement being independent of any other intervals placement of events. This process produces an Extended Data set.

Figure 8:
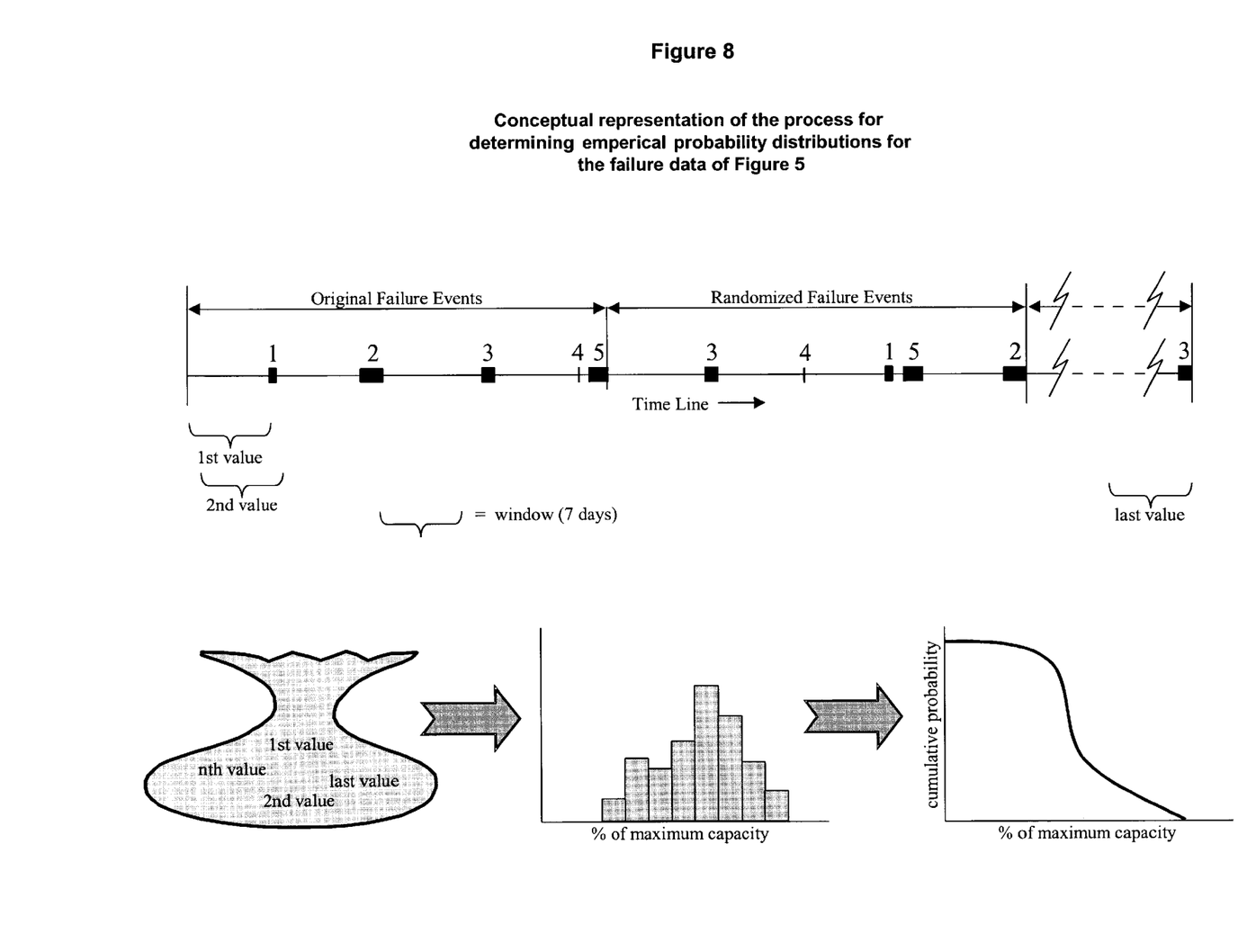
FIG. 8—A conceptual representation of the process for obtaining empirical distributions. Shown is the method of increasing the number of data points by randomizing failure events and the method of obtaining the data points with a conceptual moving window.

Next, for each contiguous portion of length P of the Extended Data set, calculate the capacity of that portion as the capacity$(j)=1-[\Sigma(TTR(I)$ within portion$)]/P$. Alternatively, the capacity can be expressed as capacity$(j)= \Sigma(TBF(I)$ within portion$)/P$. An easy way to make this calculation is to divide the Extended Data set into overlapping subsets of data, each having length P, where the first subset contains samples 1 through P, the second subset contains samples 2 through (P+1), the third contains samples 3 through (P+2), etc. This conceptual process is shown in FIG. 8.

Capacity and availability distributions are dependent on the window of time. The same data produces different distributions for different time windows. In our conceptual example of FIG. 8 the window of time is selected to be one week. The one-week window is positioned at the time line origin. The capacity for that week is determined and the value is collected. The window is advanced one day and another sample is collected. In FIG. 8, the length chosen is a 7-day period; the first contiguous portion, P(1,1), constitutes days 1–7, the next contiguous portion, P(2,1) constitutes days 2–8 (advancing the interval by one day), the next contiguous portion P(3,1) constitutes days 3–9, etc., and for each contiguous portion, is calculated the capacity C(i,1). As is also shown in FIG. 8, the data set over which analysis is performed includes the original data set, and a series of shuffled cycle data sets labeled as "Randomized Failure Events," resulting in an extended data set, generally needed to ensure that the analysis is performed on a statistically robust data set. This sampling has provided hundreds of simulations of one-week windows of plant operation. The values are developed into a histogram and finally probability density distributions and cumulative distributions, creating a first probability distribution. In some instances, there may be sufficient data in the plant's history to create the probability histograms and probability density without the need to create an extended data set of randomly shuffled cycles.

Figure 9:
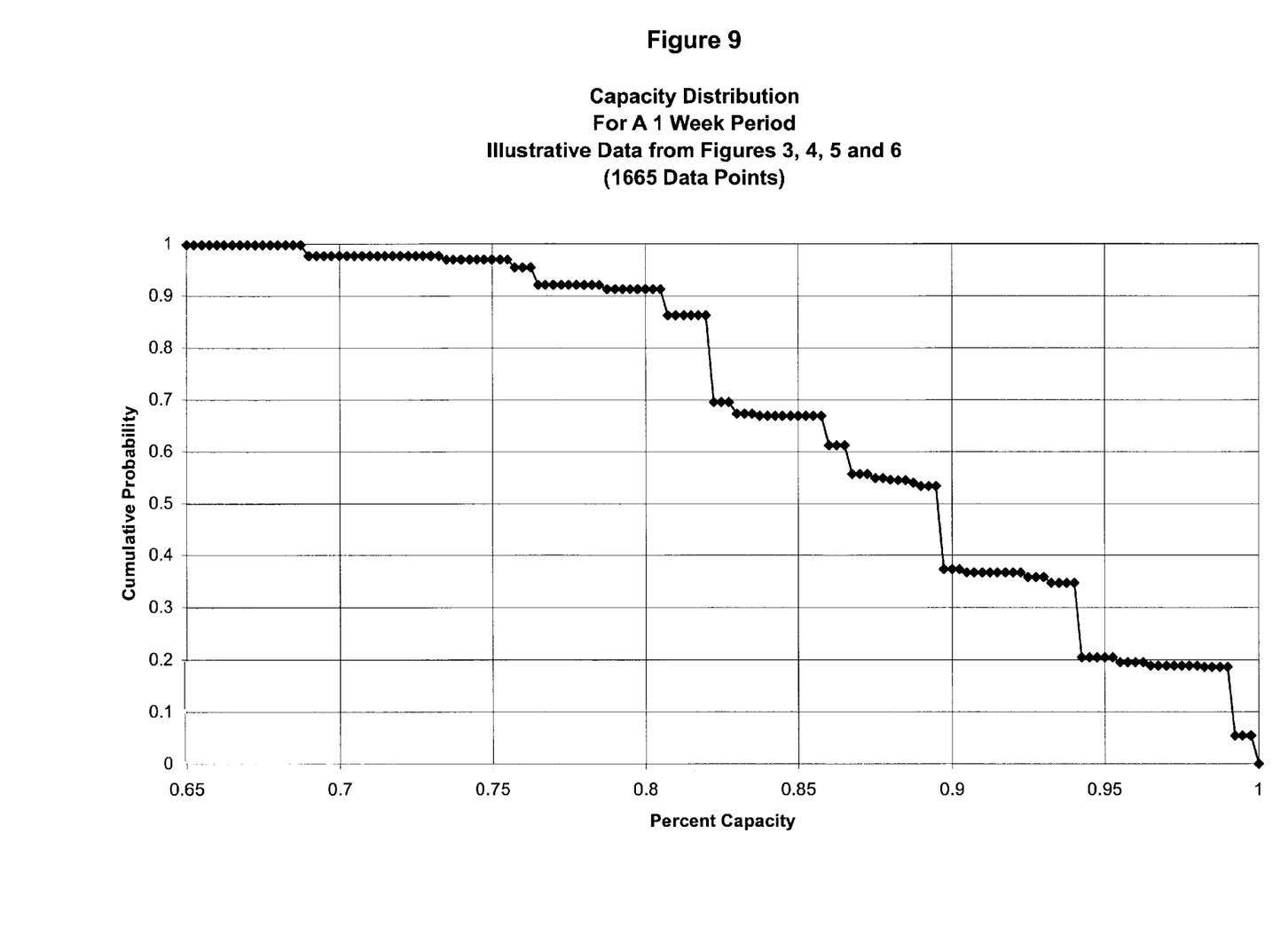
FIG. 9—An empirical cumulative probability distribution of capacity for the fictitious plant from which FIG. 3 production data was constructed.

To examine the stability of the calculated histogram, step 5 is repeated with a longer length, say 2*Y, resulting in a second histogram. The two histograms are then compared for differences. The comparison may be visual, or some metric used to compare the difference in the two sets, such as the absolute value of the set differences of the capacity probabilities, comparison of means, comparison of standard deviations, etc. This process is repeated (creating histogram (I) and comparing with prior histogram(I−1)) until the comparison shows that the two histograms tested are acceptably "close," indicating that the sequence of probability distributions is converging onto the desired probability distribution, and that the last calculated distribution is a "good" approximation to the desired probability distribution. Instead of comparing frequency histograms, normalized frequency histograms could be computed (a probability distribution) and used to test for convergence, or stability of the histogram sequence, or cumulative probability capacity histograms could be computed (as shown in FIG. 9) to test for convergence, or other types of histograms could be used to determine convergence. Histograms, in this sense are used interchangeably with the term distribution. As a final step, the "final" histogram (or intermediates) can be displayed for analysis, or transferred to another program for further use.

Figure 10:
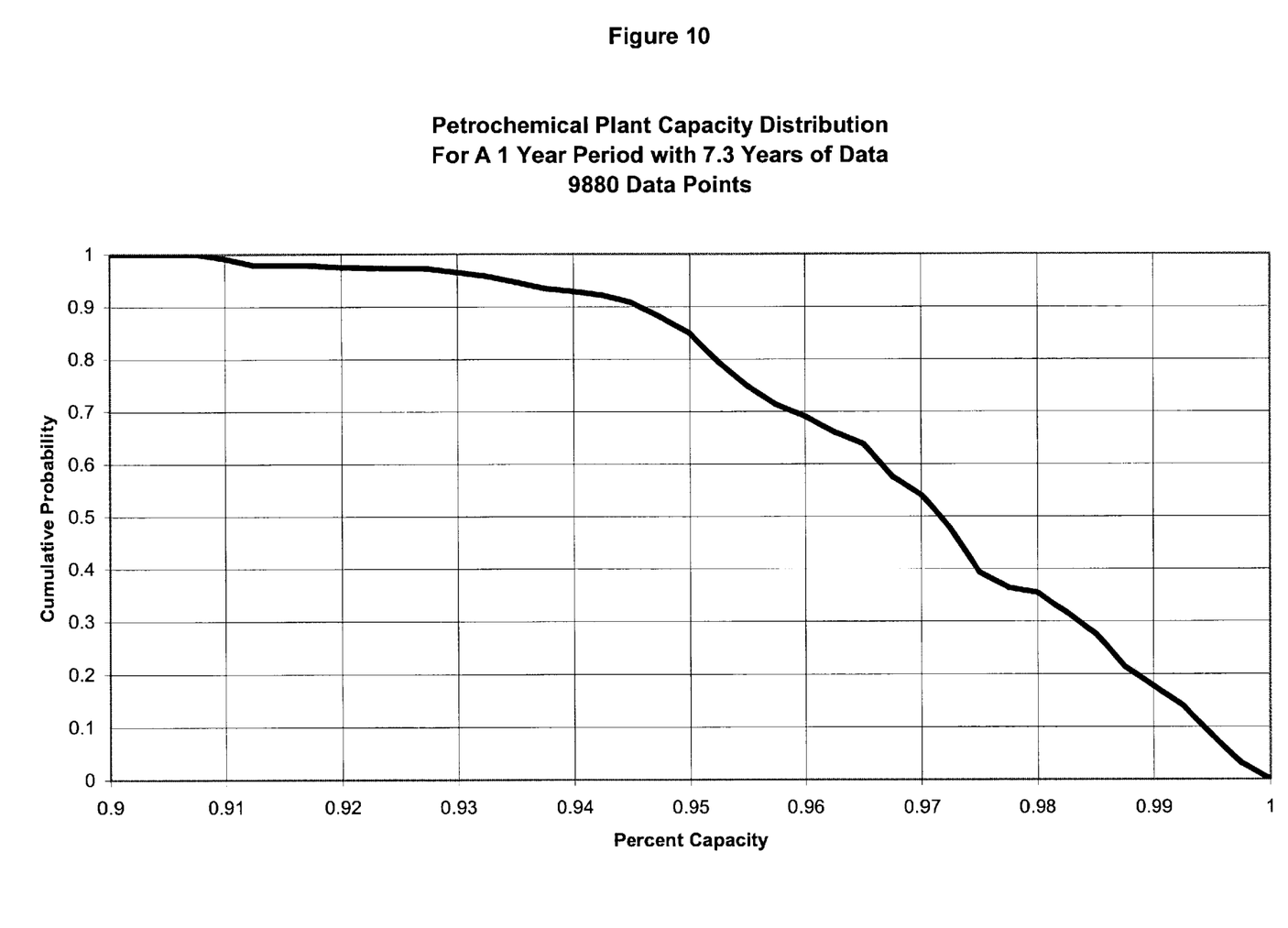
FIG. 10—An empirical cumulative probability distribution of capacity for the petrochemical plant from 7.3 years of daily production data.

In the described embodiment, the above process is conducted in a computer-spread sheet. The cumulative distribution for our example data is seen in FIG. 9. From this distribution we can determine the probability of achieving any capacity level during a future week; however, we must remember that the basis for the distribution was the one-month of plant operation shown in FIG. 3 with only five failure events. Except for illustrative purposes, this may be inadequate data to characterize the plant. FIG. 10 is the cumulative distribution for the petrochemical plant data of FIG. 7 with the first 4.7 years edited out as discussed in step 4. The distribution is based on a window of one year. The data span about 7.3 years and are adequate to characterize the plant. The variability reflected in the capacity distribution is absolutely determined by the historical variability embedded in our data. Unusual events not in our historical data will not be reflected in the forecast unless the historical data are modified as discussed in step 4.

Step 6

Forecasting and risk measurement are illustrated from FIG. 10. The 7.3 years of historical data have not been modified; therefore, the distribution we are forecasting for the future is identical to that which was actually experienced during that time. In the event we believe the future reliability of the plant is either better or worse than the prescribed history indicates, then we should either go to step 4 and modify our historical data, or conduct a limit analysis in which our results would establish levels at which we expect to be beyond or within. A rare catastrophic event may not be contained in 7.3 years of data. It can be added, but if not, it will not be reflected in the forecast. From FIG. 10 the probability of achieving any capacity is obtained. To illustrate, there is about a 50/50 chance of obtaining 97.2% of maximum capacity over an upcoming 12-month period. There is a 10% probability that capacity may be below 94.5%; however, there is a 35% probability that capacity will exceed 98%.

Step 7

This step involves placing value on the expected probabilities, such as monetary value. This step includes evaluating the costs of a percent change in plant capacity, and valuation may be a non-linear process. Generally, a value can be placed upon plant capacity, simply in terms of valuation of the product. However, valuation should begin at a valuation of the plant's product, and consider downstream consequences of failure to produce product. For instance, will product have to be purchased during a downtime to meet commitments; will contract facilities have to be maintained during downtime at increased costs? The valuation step is highly dependent upon the individual plant, and the total market conditions in which that plant operates. Once a valuation is done, the forecasted probabilities can be examined in light of the valuation to determine the economic risks or expected losses or gains. For example, one method to determine economic risks is to calculate (probability of occurrence)*(cost or value of occurrence).

Step 8

This step involves a management decision as to whether the risks are within acceptable limits. For instance, it may be that the plant needs to operate at 90% capacity to meet product commitment within the next six months. The probability of the plant capacity falling below 90% is 3%. Generally, a 3% probability is low, but if the costs of failing to meet the product commitment are in millions of dollars, the risk may not be acceptable.

Step 9

In step 9, it has been determined that the risks are acceptable, consequently, there may be an excess plant capacity that management may wish to market by adjusting its marketing strategy (step 10).

Step 11

In step 11, it has been determined that the risks are acceptable, with no additional marketing opportunities, and it is now necessary to monitor the plant performance to ensure that production goals are achieved.

Step 12

In step 12, the risks have been found to be unacceptable, so that either reliability must be improved, or production goals reduced (step 15).

Step 13

This step is to accumulate another data set that identifies the apparent cause of each production failure. This data set is developed from plant records and interviews. Each production failure is thus assigned an apparent cause.

Step 14

This step is grouping production failures into various groups, being determined by the judgment of the reliability analyst. For example, all pump failures could be grouped to measure the reliability impact of pump failures. Groups can be made by failure mode, or any other manner that aids analysis. However grouped, the groups can be prioritized to allow corrective actions to be directed at the most effective reliability improvement opportunities.

Step 15

This step adjusts the marketing plan for lower plant capacity. This step essentially reduces a plant's customer commitments to assure that there is an acceptable risk of failure to meet customer orders.

Step 16

This step is developing a reliability improvement plan. The prioritized failure groupings from step 14 are useful for this purpose. The plan includes estimating the improvement in TBFs and TTRs.

Step 17

This step reflects editing the historical data set to reflect the reliability plan TBFs and TTRs.

Steps 18–23

These steps reiterate the capacity assessment method until an effective reliability plan is developed.

Although particular aspects of the invention have been described herein with a certain degree of particularity, it should be understood that the present disclosure is made only by way of example and that numerous departures from the particular examples disclosed may be made without departing from the spirit and scope of this invention which are to be determined from the following claims.

I claim:

1. A method to determine the capacity of a plant over a time window of interest, said time window having a time length P, said method comprising the steps of:
    (a) assembling said plant's historical production data over a selected time period;
    (b) creating the cycle entry data set for said time period, said cycle entry data set representing a plant operating time of length L;
    (c) calculating the capacity ($C(i,1)$) for each contiguous portion of length P of the cycle entry data set, where "i" is an index representing the number of contiguous P length portions of the cycle entry data set of length L;
    (d) shuffling the elements in the cycle entry data set;
    (e) calculating the capacities ($C(i,j)$), j=2, for each contiguous portion of length P of said shuffled cycle entry data set;
    (f) storing said calculated capacities $C(i,2)$, j=2;
    (g) repeating steps (d)–(f) a sufficient number of times, incrementing the index j for each iteration; and
    (h) creating a histogram data set from said stored capacities $C(i,j)$.

2. A method to determine the capacity of a plant over a time window of interest according to claim 1, wherein said step of shuffling said elements in said cycle entry data set is a random shuffling.

3. The method according to claim 1 wherein at least a portion of said historical production plant data is created.

4. The method according to claim 1 wherein said steps of assembling said plant data includes the steps of editing said plant data.

5. The method according to claim 1 where said step of creating a cycle entry data set includes the step of editing said cycle entries.

6. A computer readable medium having stored thereon a series of computer executable instructions for performing the method comprising the steps of claim 1.

7. A method to determine the capacity of a plant over a time window of interest, said time window having a time length P, said method comprising the steps of:
    (a) assembling said plant's historical production data over a selected time period;
    (b) creating the cycle entry data set for said time period, said cycle entry data set representing a plant operating time of length L;
    (c) calculating the capacity $C(i,1)$ for each contiguous portion of length P of said cycle entries from the previous step, where "i" is an index ranging over the number of contiguous P length portions of the cycle entry data set of length L; and
    (d) creating a first histogram(1) data set from said stored capacities $C(i,1)$.

8. A method to determine the capacity of a plant over a time window of interest according to claim 7, further comprising the steps of:
    (f) shuffling said cycle entries;
    (g) calculating said capacity $C(i,2)$ for each contiguous portion of length P of said shuffled cycle entries where i is an index ranging over the number of contiguous P length portions of the cycle entry data set of length L;
    (h) creating a second frequency histogram(2) data set from said stored capacities $C(i,2)$;

(i) comparing said histogram(1) data set to said histogram (2) data set; and (j) repeating steps (f)–(i) for a sufficient number of iterations.

9. A method to determine the capacity of a plant over a time window of interest according to claim 8, wherein said step of shuffling said cycle entries is a random shuffling.

10. A method to determine the capacity of a plant over a time window of interest according to claim 8, wherein said sufficient number of iterations is determined by comparing histogram(I) data set with histogram(I-1) data set for convergence.

11. The method according to claim 7 wherein at least a portion of said historical production plant data is created.

12. The method according to claim 7 wherein said steps of assembling said plant data includes the steps of editing said plant data.

13. The method according to claim 7 where said step of creating a cycle entry data set includes the step of editing said cycle entries.

14. A computer readable medium having stored thereon a series of computer executable instructions for performing the method comprising the steps of claim 7.

15. A method to determine the capacity of a plant over a time window of interest, said time window having a time length P, said method comprising the steps of:

(a) assembling said plant's historical production data over a selected time;

(b) calculating the cycle entry data set for said time period, said cycle entry data set representing a plant operating time of length L;

(c) creating a first extended cycle entry data set from said cycle entry data set by including at least one shuffled cycle entry data set in said extended cycle entry data set, said extended cycle entry data set representing a plant operating time of length M(1);

(d) calculating the capacity C(i,1) for each contiguous portion of length P of said first extended cycle entry data set, where "i" is an index ranging over the number of contiguous P length portions of the extended cycle entry data set of length M(1); and (e) creating a histogram data set from said stored capacities.

16. A method to determine the capacity of a plant over a time window of interest according to claim 15, further comprising the steps of (f) for j=2 Repeating step (d) by adding a greater number of shuffled cycle entry data sets to create a j-extended cycle entry data set of length M(j), said length being greater than said previous extended cycle entry data set of length M(j-1);

(g) calculating the capacity C(i,j) for each contiguous portion of length P of said j-extended cycle entry data set, where "i" is an index ranging over the number of contiguous P length portions of the extended cycle entry data set of length M(j);

(h) creating a histogram(j) data set from said capacities C(i,j).

17. The method according to claim 16 further comprising the steps of repeating steps (f)–(h) for a sufficient number of iterations, incrementing j on each iteration.

18. The method according to claim 16 wherein a graphical representation of said histogram(j) data set is produced.

19. The method according to claim 16 wherein at least a portion of said historical production plant data is created.

20. The method according to claim 16 wherein said steps of assembling said plant data includes the steps of editing said plant data.

21. The method according to claim 16 where said step of creating a cycle entry data set includes the step of editing said cycle entries.

22. A computer readable medium having stored thereon a series of computer executable instructions for performing the method comprising the steps of claim 16.

23. A method to determine the capacity of a plant over a time window of interest, said time window having a time length P, said method comprising the steps of:

(a) assembling said plant's historical production data over a time period;

(b) creating a first cycle entry data set for said time period, said first cycle entry set representing a plant operating time of length L;

(c) creating a first extended cycle entry data set, said first extended cycle entry data set being a set of M1 cycle entry data sets, where each of said M1 cycle entry data sets is a shuffled version of said first cycle entry data set, M1 being a pre-selected integer;

(d) calculating the capacities (C(i,1)) for each contiguous portion of length P of said first extended cycle entry data set, where "i" is an index ranging over the number of contiguous P length portions in said first extended cycle entry data set; and (e) creating a histogram data set from said capacities C(i,1).

24. The method according to claim 23 further comprising the steps of:

(f) creating a second extended cycle data set of length M2, where M2 is an integer not equal to M1;

(g) calculating the capacity (C(i,2)) for each contiguous portion of length P of the cycle entry data set, where "i" is an index ranging over the number of contiguous P length portions of said second extended cycle data set; and (h) creating a second histogram data set from said capacities C(i,2).

25. The method according to claim 24 further comprising the steps of (i) testing said second histogram data set for convergence, and if convergence is lacking;

(j) creating a third extended cycle data set of length M3, where M3 is an integer not equal to M2;

(k) calculating the capacity (C(i,3)) for each contiguous portion of length P of the cycle entry data set, where "i" is an index ranging over the number of contiguous P length portions of said third extended cycle data set;

(l) creating a third histogram data set from said capacities C(i,3); and (m) testing said third histogram data set for convergence.

26. The method according to claim 23 wherein at least a portion of said historical production plant data is created.

27. The method according to claim 23 wherein said steps of assembling said plant data includes the steps of editing said plant data.

28. The method according to claim 23 where said step of creating a cycle entry data set includes the step of editing said cycle entries.

29. A computer readable medium having stored thereon a series of compute executable instructions for performing he method comprising the steps of claim 23.

* * * * *